Patented Oct. 17, 1933

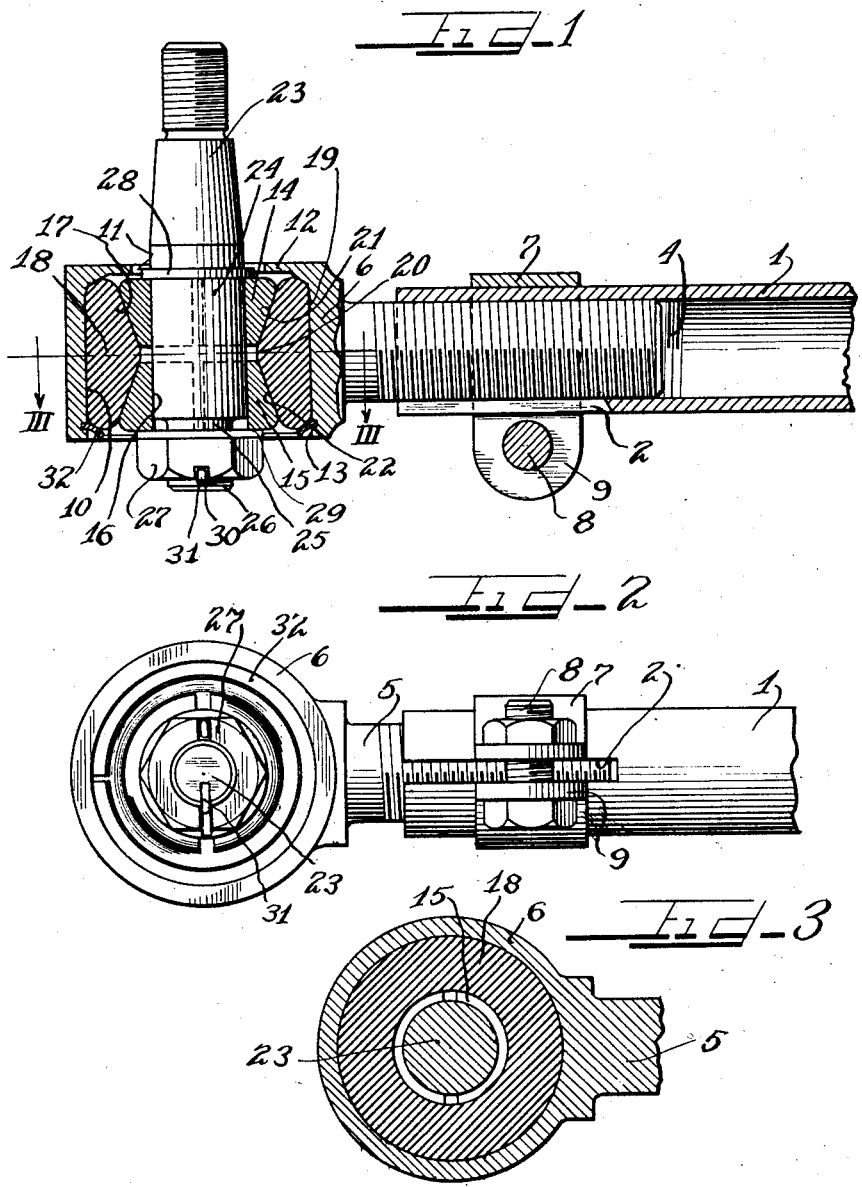

1,931,258

UNITED STATES PATENT OFFICE 1,931,258

TIE ROD END ASSEMBLY

George H. Hufferd and Matthew P. Graham, Detroit, Mich., assignors to Thompson Products, Incorporated, Cleveland, Ohio, a corporation of Ohio Application March 26, 1931. Serial No. 525,483

5 Claims. (Cl. 287—85)

This invention relates to a tie rod end and more particularly to a tie rod end bearing assembly for use in the steering mechanism of automotive vehicles.

It is an object of this invention to provide a flexible bearing assembly including the tie rod and stud associated therewith equivalent in action to the well known ball joint connections usually provided in steering mechanisms and formerly considered as a necessary form of construction to provide the limited universal movement necessary to take care of variations in alignment of the parts of the steering mechanism.

It is a further object of this invention to provide a tie rod end bearing assembly that can be manufactured much more inexpensively than a ball joint, while at the same time being self-adjusting to take care of wear and providing efficient friction between the bearing surfaces and resiliency of bearing assembly to prevent play and rattle.

It is a still further object of this invention to provide a novel form of universal joint in which a cylindrical stud is substituted for the customary ball shaped stud and in which the housing is provided with a resilient bearing member for encircling the stud.

It is a particular object of this invention to provide a universal joint in which the parts are held in assembled relation by a novel locking means.

It is a further particular object of this invention to provide a joint having a resilient bushing to allow for angular movement between the housing and stud and in which the principal stresses in the resilient member are radial stresses.

Other and further important objects of this invention will be apparent from the disclosures in the specification and more fully pointed out in the appended claims.

This invention (in a preferred form) is illustrated in the drawing and hereinafter more fully described.

On the drawing:

Figure 1 is a longitudinal sectional view with parts in elevation showing the embodiment of my invention.

Figure 2 is a bottom plan view of the device of Figure 1.

Figure 3 is a fragmentary sectional view taken on the line III—III of Figure 1.

As shown on the drawing:

The reference numeral 1 indicates a tie rod having a longitudinal split along its lower end portion as indicated at 2. The rod 1 is tubular and its end is internally threaded as shown at 4 for the reception of a threaded arm 5 which is an integral projection from the housing 6. A yoke or clamp 7 encircling the end of the rod member 1 serves to hold said arm 5 and said rod member in permanent engagement by means of a bolt 8 extending through the free flanged end 9 of said yoke 7.

The housing 6 is preferably cast integral with the arm 5 and is formed with an enlarged cylindrical recess 10 terminating at the upper portion thereof in a smaller aperture 11 to thereby form an annular flange 12. An annular recess 13 is provided in the lower portion of the wall of the housing 6.

The bearing portion of the assembly comprises upper and lower seat members 14 and 15. Each of the members 14 and 15 comprises a pair of spaced annular sections having inner cylindrical surfaces 16 and outer frusto-conical surfaces 17. When in assembled relation, the seat members 14 and 15 are in such position that their smaller ends are adjacent, but in spaced relation, and at the middle portion of the housing.

A rubber ring 18 is fitted into the housing so as to surround the seat members 14 and 15. The rubber ring 18 is preferably of sufficient thickness so as to exert a pressure against the seat members due to its being compressed when positioned in the housing. For this purpose, the rubber ring 18 is provided with an outer cylindrical surface 19, the diameter of which is such as to permit a snug fit within the bore 10. The inner surface of the rubber ring 18 is provided with an annular rib 20 along its mid portion and sloping surfaces 21 and 22 extending therefrom so as to contact the frusto-conical surfaces 17 of the seat members 14 and 15 respectively throughout their length.

The stud member 23 comprises a cylindrical portion 24 which is rotatably mounted in the seat members 14 and 15, the cylindrical surfaces 16 contacting therewith. The stud 23 has a reduced portion 25 at the lower end thereof which is screw threaded as at 26 to receive the locking nut 27. The cylindrical portion 24 is provided with an integral collar 28 at the upper end thereof against which the upper seat member 14 presses. The lower portion of the stud is provided with a washer 29 which is urged into contact with the lower end of the seat member 15 by threading the nut 27 on the shank 26 of the stud member.

The nut 27 is preferably provided with a recess 30 into which a cotter pin or locking pin 31 fitted through a recess in the shank 25 is adapted to lie so as to hold the nut against unscrewing. The whole assembly is kept in place by a split ring 32 which fits into the annular groove 13 and which contacts with the rubber ring 18, holding it against the seat members and the annular flange 12 to securely keep the parts in position.

To assemble the parts, the seat members 14 and 15 are wedged between the ring 18 and the stud 24 and the washer 29 and nut 27 are placed on the shank of the stud. The parts thus assembled are forced into the housing, it being advisable at this point not to have the nut 27 threaded tightly so as to allow for contraction of the ring 18. When the assembly is in the housing, the nut 27 is screwed home to thereby compress the ring 18, and the pin 31 is inserted therein to lock the nut in place. Finally, the ring 32 is forced into its position in the annular groove 13 to hold the parts in assembled relation.

It will be seen that by this invention there is provided a universal joint adapted for a tie rod end assembly in automobile construction which provides for sufficient movement of the stud with respect to the housing on the tie rod, without recourse to the expense of providing a ball shaped stud and a suitable housing therefor. Further, in such an assembly as herein disclosed the rubber member is such as will compensate for wear of the parts and also exert a sufficient pressure upon the stud member to prevent excessive rattling. Particular advantages arise from the simplicity of construction and ease of assembly and adjustment.

In the particular assembly disclosed herein, angular movement of the stud with respect to the housing will cause compression of the resilient bushing but the forces will be normal to the bushing and consequently there will not be an appreciable distortion of the flexible member as in the case of flexible cylindrical bushings.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a tie rod end bearing assembly, a housing providing a cylindrical socket having an apertured end wall, a pair of sectional seat members within said socket, a rubber ring positioned within said socket and about said seat members, said rubber ring having a raised midportion on its inner surface a cylindrical stud rotatably mounted in said seat members, a member on the lower end of the stud contacting with the end of the lower seat member and detachable means about the lower periphery of said socket between which and said end wall, said rubber ring is compressed.

2. In a tie rod end bearing assembly, a housing providing a cylindrical socket having an apertured end wall, a pair of split seat members within said socket, a rubber ring positioned in said socket and held under radial compression between said seat members and said socket in non-rotative engagement therewith relative thereto, said rubber ring having a raised midportion on its inner surface, a cylindrical stud mounted in said seat members, a member on the lower end of said stud, contacting with the end of the lower seat member and detachable means about the lower periphery of said socket between which and said end wall, said rubber ring is compressed.

3. In a tie rod end bearing assembly, a housing providing a cylindrical socket having an apertured end wall, a pair of seat members within said socket each having a pair of wedge shaped sections, a rubber ring positioned in said socket and held under radial compression between said seat members and said socket in non-rotative engagement therewith relative thereto, said rubber ring having an inner surface tapering from its midportion to its ends to provide faces parallel to the outer surfaces of the seat members, a cylindrical stud mounted in said seat members having an integral collar at the upper end thereof and having adjustable means on the lower end thereof for urging the seat members toward each other to urge said ring against said socket and detachable means about the lower periphery of said socket between which and said end wall, said rubber ring is compressed.

4. In a tie rod end bearing assembly, a housing providing a cylindrical socket having an apertured end wall, a pair of seat members within said socket each comprising a pair of spaced sections having outer semi-frusto-conical surfaces, a rubber ring having a ridge at its middle portion to provide inner surfaces parallel to the outer surfaces of the seat members, said ring being positioned in said socket and held under radial compression between said seat members and the wall of said socket in non-rotative engagement therewith relative thereto, a cylindrical stud mounted in said seat members, an integral collar at the upper end of said stud, adjustable means at the lower end of said stud for urging said seat members toward each other to compress said ring within said socket and detachable means about the lower periphery of said socket between which and said end wall, said rubber ring is compressed.

5. In a tie rod end bearing assembly, a housing providing a cylindrical socket having an apertured end wall, a pair of seat members within said socket each having a pair of sections having outer semi-frusto-conical surfaces, a rubber ring having a ridge at its middle portion to provide surfaces parallel to the outer surface of the seat members, positioned in said socket and held under radial compression between said seat members and said socket in non-rotative engagement therewith relative thereto, a cylindrical stud rotatably mounted in said seat members, having an integral collar at the upper end thereof and having adjustable means at the lower end thereof for urging said seat members toward each other to urge said ring against said socket and a split ring for engagement in an annular recess in the lower portion of said socket between which and said end wall, said rubber bushing is compressed.

GEORGE H. HUFFERD.
MATTHEW P. GRAHAM.